Feb. 16, 1926.  1,573,638
H. C. EVELYN
SIGNAL DEVICE FOR MOTOR VEHICLES
Filed March 14, 1925   2 Sheets-Sheet 1
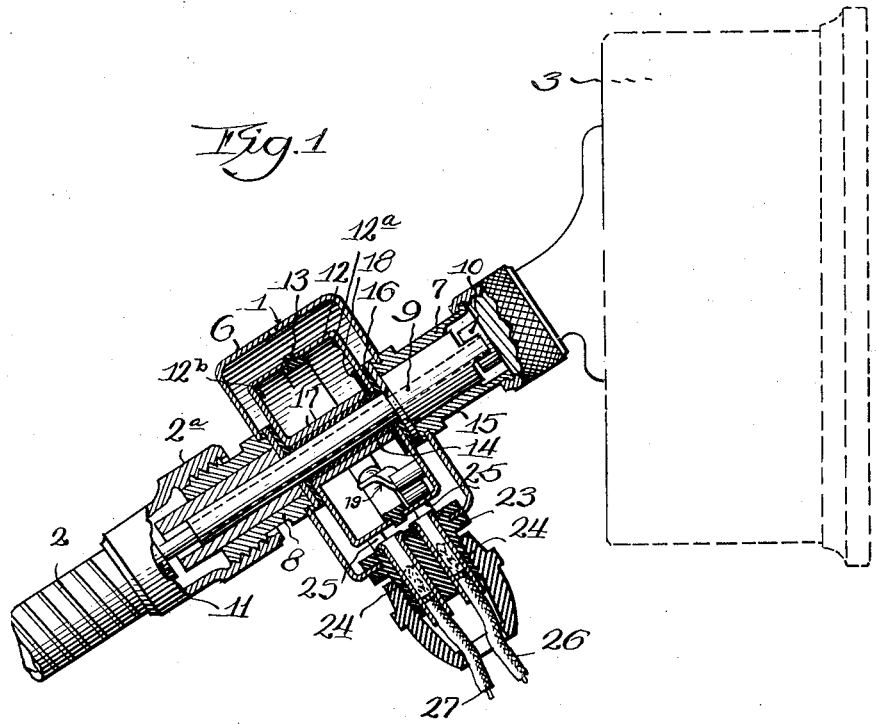
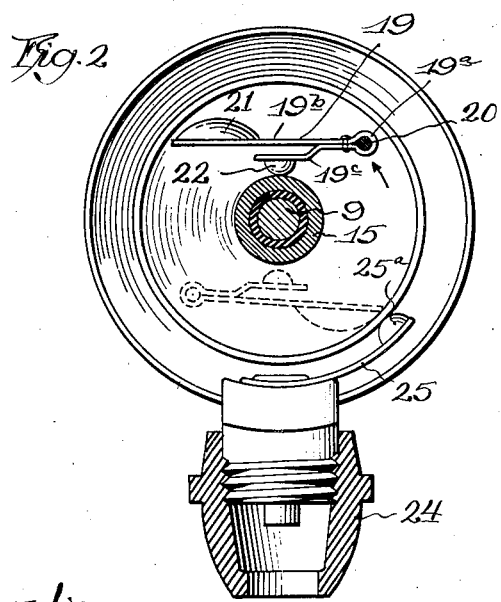
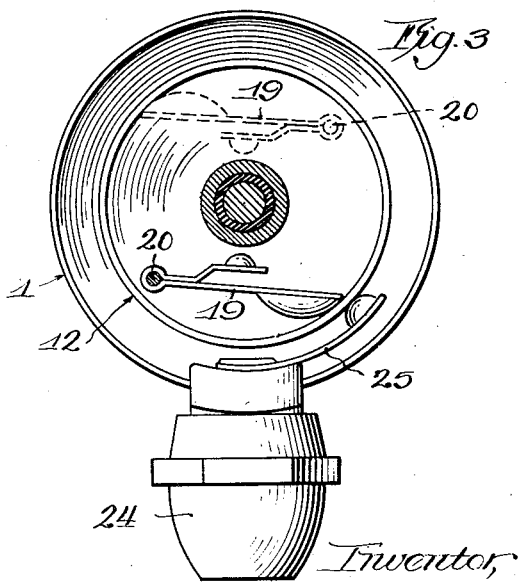
Witness:
Inventor,
Harry C. Evelyn Feb. 16, 1926.
H. C. EVELYN
1,573,638
SIGNAL DEVICE FOR MOTOR VEHICLES
Filed March 14, 1925
2 Sheets-Sheet 2

Witness
Chas. R. Toursh

Inventor,
Harry C. Evelyn,
Attys.

Patented Feb. 16, 1926.

1,573,638

UNITED STATES PATENT OFFICE.

HARRY C. EVELYN, OF CHICAGO, ILLINOIS.

SIGNAL DEVICE FOR MOTOR VEHICLES.

Application filed March 14, 1925. Serial No. 15,444.

*To all whom it may concern:*

Be it known that I, HARRY C. EVELYN, a citizen of the United States of America, and a resident of Chicago, Cook County, Illinois, have invented a certain new and useful Improvement in Signal Devices for Motor Vehicles, of which the following is a specification.

This invention relates to improvements in signal devices for motor vehicles, and more particularly to an automatic switch for controlling a signal device adapted to primarily indicate by a blinking or intermittent flashing light, the movement of the vehicle at a relatively low speed or when stationary with the motor running.

A further object of the invention is to provide a self-contained switch or signal controlling device which may be readily inserted in the flexible shaft drive of the speedometer or mileage indicating instrument of the vehicle.

A further object of the invention is to provide a switch or signal controlling member, in which the force of gravity is utilized for producing the blinking signal and centrifugal force for automatically throwing the signal switch out of operation when the speed of the vehicle exceeds a prescribed limit.

A preferred embodiment of the improved device is disclosed in the accompanying drawings in which, Figure 1 is a general view showing the application of the switch in the speedometer cable, the switch being shown in axial section.

Figure 2 is a cross sectional view of the switch showing the parts in circuit closing positions.

Figure 3 is a view similar to Figure 2 showing the parts in circuit opening position.

As already suggested, the present invention pertains to a signal device mounted at the rear of a motor vehicle and adapted to visually indicate the movement of the vehicle at a relatively slow speed, as, for instance, when accelerating from a stop, or slowing down preparatory to a stop or a change in direction. Moreover, the device is designed to function at predetermined speeds of the vehicle, say, between zero and ten miles per hour, whether accelerating or retarding and is automatically cut out when the speed exceeds that which is regarded as the limit beyond which danger of collision with other moving vehicles is reduced to a minimum.

Being essentially a warning signal, indicating that the vehicle is moving at a relatively low speed, it is to be distinguished from the ordinary "stop" signal, which is operated by the foot brake, although the two may be used in conjunction with each other. For this reason it is preferred to use what may be termed a blinking light or "blinker" for the present signal, so that it will not be confused with the steady light of the stop-light. In fact, it is contemplated that a complete set of rear signals would consist of a unitary lamp casing in which would be located the tail lamp, the stop-light, and the blinker signal, each with its separate lens or bullseye, different colors being used, if desired, to distinguish the different signals, with the exception that the tail light would remain red.

Figure 4:
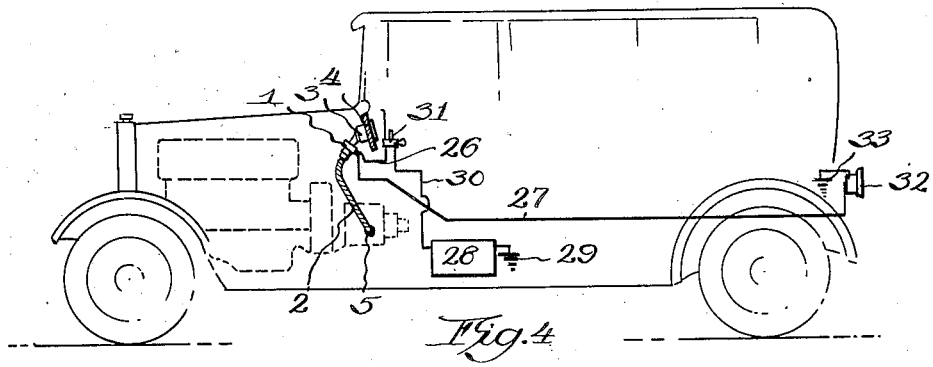
Figure 4 is a diagrammatic representation of a vehicle showing the switch installed and the signal lamp circuit.

As a convenient location and method of applying the blinking signal circuit switch 1 to a vehicle, it is so constructed that it can be readily inserted in the flexible shaft 2 of the speedometer, either at the end adjacent the instrument case 3, and behind the instrument board 4, as shown in Figures 1 and 4, or at the lower end of the shaft adjacent the transmission casing 5, in which case the switch would be beneath the floor boards and out of sight. The location, however, is a matter of choice and does not affect the operation.

The switch 1 comprises in general, a cylindric outer casing 6 having tubular bearing and connecting members 7 and 8 extending axially from opposite sides thereof. These tubular members are fitted at their ends with suitable threaded connections or couplings, one a female and the other a male, and designed for threaded connection with the threaded extension 3ª at the back of the speedometer 3, and the coupling sleeve 2ª at the upper end of the flexible shaft cable 2, respectively, so that by disconnecting the cable at either end the casing can be inserted without interfering with the speedometer drive.

The casing supports a shaft 9, extending axially thereof and journalled in the tubular members 7 and 8, one end of this shaft having a tongue and the other a slot, so as to engage the complementary slot and tongue in the stub shaft 10 of the speedometer and the tongue 11 at the end of the flexible shaft, within the cable 2. Thus, by disconnecting the cable 2 from the instrument 3, the switch can be inserted in the manner clearly shown in Figure 1.

It will be observed that the axis of rotation of the shaft is approximately 45 degrees to the vertical, this being the usual manner in which speedometers are driven, although the angle may vary. It may be noted at this point that the operation of the switch requires that the axis of rotation be other than vertical although the degree of angularity is immaterial. The reason for this will be presently seen.

The casing 1 is preferably a metal shell made in two halves fitted and locked together and having axially disposed openings in which are fitted and secured the inner ends of the tubular members 7 and 8.

Mounted on the shaft 9 and enclosed within the casing 1 is an inner casing or shell 12 of the same shape, but relatively smaller, this shell consisting of two cup-shaped halves or sections, 12ª and 12ᵇ, electrically insulated from each other by an insulating ring 13, between their opposing peripheral edges, and from the shaft 9, by an arrangement of insulating washers and collars as follows: A sleeve 14 of insulating material surrounds the shaft 9 and against which the internal edges of the sections bear. Between the section 12ª and the adjacent end of the upper tubular member 7, is a metal washer or bushing 15, and between that and the section itself is an insulating washer 16, thus completely insulating this section or half from the adjacent metal parts. The other section 12ᵇ is similarly insulated from the shaft 9 by the same arrangement of an insulating washer 16, between the metal bushing 15 and the end of the lower tubular member 8. Surrounding the insulating sleeve 14 is a metal sleeve 17, abutting at one end against the left hand section 12ᵇ, but is insulated from the right hand section 12ª by another insulating washer 18 inserted between the opposite end of the sleeve 17 and the inner surface of the last mentioned section 12ª. Thus the section 12ᵇ is insulated from all adjacent metal parts except the sleeve 17 which forms an annular contact surface surrounding the shaft 9.

Enclosed within the shell 12 and carried by the section 12ª thereof, is a pivoted wiper or contact member 19 mounted to swing or pivot on a pintle 20 projecting inwardly from the radial wall of the section near its periphery. The contact member preferably consists of a flat strip of metal bent to form an eye 19ª engaging the pintle 20, a relatively long arm 19ᵇ carrying a weight 21 at its end, and a shorter arm 19ᶜ offset toward the axis of rotation and provided with a contact point 22.

Extending radially from the outer shell or casing is a conductor lead-in fitting 23, in which is embedded two conductor terminals 24, each provided with a contact brush 25 in the form of curved strips of metal extending circumferentially between the inner and outer shells, and having contact points 25ª at their ends. These wipers are spaced apart axially, so that they are opposite the annular surfaces of the sections 12ª and 12ᵇ, of the inner shell 12, with which they have constant wiping contact.

Figure 5:
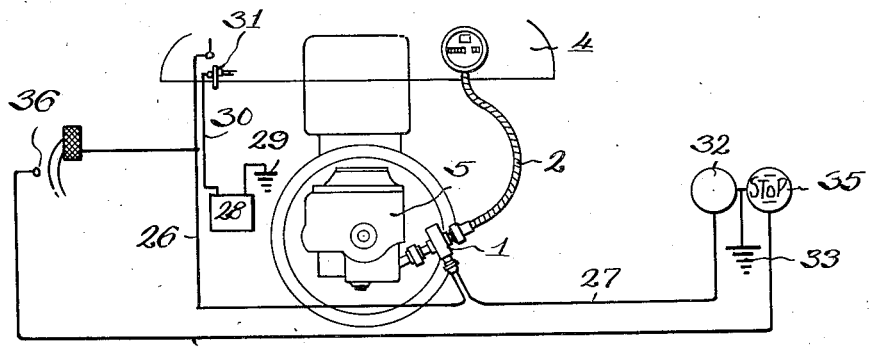
Figure 5 is a diagrammatic representation of the signal installation, in which the switch is driven from the lower end of the speedometer shaft, but otherwise showing the complete signal circuit.

Electrically connected with each of the terminals 24, are conductor wires 26 and 27 one leading to the switch and the other from the switch, although electrically they are on the same side (positive) of the signal circuit, which will now be traced, reference being had to Figures 4 and 5.

Starting with the storage battery 28, which has its negative pole grounded to the frame of the vehicle at 29, a positive conductor 30 leads to a switch 31, the ignition switch of the vehicle being preferably used, since by that arrangement the signal will be operative when the vehicle is moving or the motor running. Connected with the other terminal of the switch is the aforementioned conductor 26 leading to the automatic switch 1, the other conductor 27 leading from the switch to the signal lamp 32 mounted at the rear of the vehicle which has its positive side grounded to the frame at 33. The stop-light circuit may be connected in parallel with the automatic signal circuit as shown in Figure 5, by a conductor 34, leading from the conductor 26 of the automatic signal circuit to a stop signal lamp 35, either in the same or separate casing, and having separate or common ground connection with the frame at 33. A switch 36 graphically represented by a foot pedal is located in the conductor 34, and operates the stop signal whenever the brake is applied.

Referring now to Figures 1, 2 and 3, the operation of the signal device will be described. The shaft 9, being a part of the shaft of the speedometer drive, which in turn is driven from the transmission or other parts of the vehicle running gear, will rotate at a speed varying proportionally with the speed at which the vehicle is moving. Thus, when the vehicle is in motion the moving parts of the switch rotate about the axis of the shaft. Thus, the contact member 19, which is electrically connected with the section 12$^a$ rotates about the shaft and at the same time has a relative swinging movement on the pin 20. Let it be assumed first that the parts come to rest momentarily with the contact member 19 in the position shown in Figure 2, in which the contact point 22 is in contact with the sleeve 15. The current flowing through the conductor 26 passes to the section 12$^a$, through its brush 25, thence through the contact member 19 to the sleeve 15, thence to the other section 12$^b$, and finally taken off by the other brush 25 and conductor 27. Thus, so long as the contact member rests on the sleeve 15 the circuit is closed and the signal lamp is lighted. Now, assume that the shaft is turned through 180 degrees, bringing the contact member 19 below the axis, to the position shown in dotted lines. Now the contact is broken between the contact member 19 and the sleeve 15 and the circuit is open, due to the force of gravity acting on the weighted arm causing the same to fall away. Thus, it follows that as the shaft continues to rotate in say, a counter-clockwise direction, there will be contact between the arm 19 and the sleeve 15 throughout the top half of its circumference and a breaking of the contact through the lower half. Thus, for one-half revolution of the shaft the lamp circuit will be closed and the other half revolution it will be open, thereby producing an intermittent or flashing signal at the lamp 32.

This action will continue so long as the speed of rotation is relatively low, that is, corresponding to a speed of say ten miles per hour of the vehicle. When this critical speed is reached, the centrifugal force which is constantly acting on the weighted arm of the contact member 19 has not reached the point where it overcomes the force of gravity acting on the arm, to close the circuit during the upper arc of the sleeve 15, with the result that the contact is broken throughout each complete revolution as shown in Figure 3. In other words, the signal is entirely cut out when the vehicle has reached and continues to travel at a speed greater than that at which gravity ceases to function to close the circuit. Obviously, as the vehicle slows down to and below the critical speed, the force of gravity overcomes the centrifugal force and the intermittent flashing or blinking signal will again function.

Figure 7:
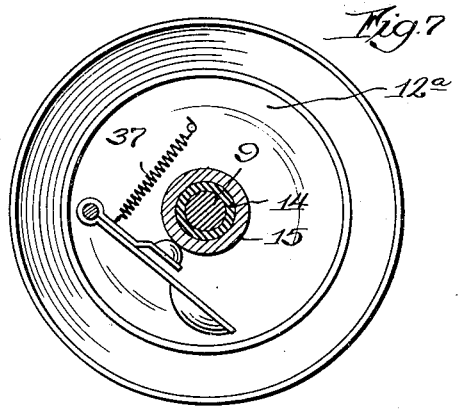
Figure 7 is a similar view showing still another modification.

It will be evident now, why it is that the axis of rotation must incline to the vertical, since otherwise the contact arm 19 would not be actuated by gravity to make and break the circuit and produce a blinking signal. It would be possible by the application of a spring to replace the force of gravity by tension so that the device could function in a vertical positon, but such an arrangement would only produce a steady light which would be cut out by centrifugal force, acting on the arm. I have disclosed such a modification in Figure 7, in which a light spring 37 is fastened to the arm 19 near its pivoted end and secured at its other end at a point located in the opposite side of the axis of rotation. This disclosure suggests the possibility of using a light spring to partially oppose the action of gravity, so that there would be contact throughout a greater arc, although the switch would be preferably inclined to the vertical, so that gravity would still act to break contact throughout a portion of each revolution.

Figure 6:
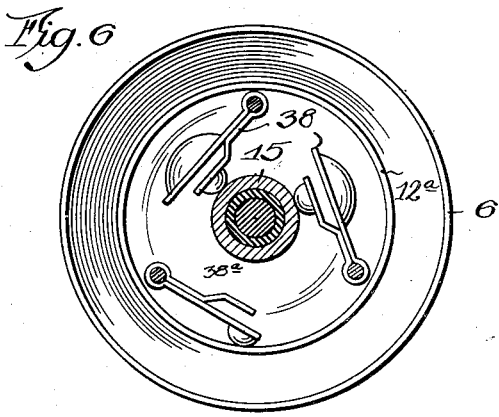
Figure 6 is a sectional view of the switch, showing a modified arrangement of circuit closing members.

Figure 6 suggests the possibility of using a plurality of contact arms 38 about the section 12$^a$. In such an arrangement each contact member would be thrown into and out of contact through each successive half revolution, but since each member would be in contact during different periods in each revolution, two of them would be in contact at all times, with a slight overlapping of their periods of contact, so that the result would be a sustained duration of the flashes and a shortening of the intervals between flashes.

The number of contact members used, however, would be governed by the range of speeds at which the switch rotated, since it is readily manifest that the higher the speed the shorter will be the interval between flashes, until a point is reached where there would scarcely be a noticeable blinking. To compensate for this it would be desirable to provide one of the contact arms 38, with a weight 38$^a$ lighter than that of the other arms. The effect of this would be to have the lighter weighted contact arm cut out completely at a lower speed than the others, thereby prolonging the interval between flashes. Similarly, where more than one contact arm is used the weights may be varied so that they will be successively cut out as the speed increased, thereby maintaining the frequency of the flashes practically uniform, until the heaviest weighted arm is finally cut out at the critical speed and the signal ceases to function, in accordance with the method already set forth.

Having set forth the objects and preferred embodiments of the device embodying the invention, I claim:

1. A switch, for controlling a signal device for vehicles, comprising a rotative body member, means for driving said body member at a speed proportional to the speed of the vehicle, said body consisting of two electrically insulated sections, a circuit closing member mounted on one of said sections and adapted to be shifted by gravity to alternately open and close a circuit through the other section in the rotation of said body member at less than a predetermined speed, and to be actuated by centrifugal force to maintain the circuit open at speeds greater than said predetermined speed.

2. A switch for controlling a signal device for vehicles comprising a rotative body member, means for driving said body member at a speed proportional to the speed of the vehicle, said body member consisting of two electrically insulated sections, a contact arm mounted on one of said sections and adapted to be shifted by gravity into and out of contact with the other section, in the rotation of said body member at less than a predetermined speed, and to be actuated by centrifugal force to be held out of contact at speeds greater than said predetermined speed.

3. A switch for controlling a signal device for vehicles comprising a shaft, means for driving said shaft at speeds varying proportionally to the speed of the vehicle, radially disposed sections mounted on said shaft and insulated therefrom, and each other, a weighted contact arm pivotally mounted on one of said sections and movable relatively thereto by gravity into and out of circuit closing contact with the other of said sections, in the rotation of said shaft, and conductors having terminals in wiping contact with said sections.

4. A switch for controlling a visual signal device for vehicles comprising a body member rotative about an axis disposed at an angle to the vertical, a circuit closing member, mounted on said body member, and movable relative thereto into and out of circuit closing position, by the action of gravity as it rotates bodily about said axis.

5. A switch for controlling a visual signal device for vehicles comprising a body member rotative about an axis disposed at an angle to the vertical, means for rotating said body member at a speed varying proportionally to the speed of the vehicle, a circuit closing member mounted on said body member and movable relative thereto, a contact member in the path of said circuit closing member, and insulated therefrom, said circuit closing member being actuated by gravity to make and break contact with said contact member during each revolution of said body member at predetermined speeds of rotation, and subject to centrifugal force at speeds other than said predetermined speeds whereby said circuit closing member is held out of contact with said contact member during each revolution.

6. A switch for controlling a signal device for vehicles comprising a rotative body member, means for driving said body member at a speed proportional to the speed of the vehicle, said body member consisting of two electrically insulated sections, a conductor having constant wiping contact with each of said sections, a contact arm pivotally mounted on one of said sections and adapted to be shifted by gravity into and out of contact with the other section, in the rotation of said body member at less than a predetermined speed, and to be actuated by centrifugal force to be held out of contact at speeds greater than said predetermined speed.

7. A switch for controlling a signal device for vehicles comprising a casing shaft, journaled in said casing and adapted to rotate at speeds varying proportionally to the speed of the vehicle, a body member mounted on said shaft and insulated therefrom, and consisting of sections insulating from each other, a weighted contact arm pivotally mounted on one of said sections and adapted to swing by gravity into and out of circuit closing contact with the other of said sections, in the rotation of said shaft about an axis inclined to the vertical and conductors having terminals in wiping contact with said sections.

8. A switch for controlling a vehicle signal comprising a casing, a shaft journaled in said casing and adapted to be driven at a speed varying proportionally to the speed of the vehicle, a sectional body member mounted on said shaft, the sections thereof being insulated from each other and said shaft, a contact member pivotally mounted on one of said sections and free to swing into and out of contact with the other section in its bodily rotation about the axis of said shaft, said contact member having a weighted arm, subject to gravity, whereby in rotation of shaft at less than a predetermined speed the circuit will be alternately made and broken, through said switch and further subject to centrifugal force, whereby at greater than said predetermined speed, the force of gravity will be overcome and the circuit through the switch will be maintained open.

Signed at Chicago, this 9th day of March, 1925.

HARRY C. EVELYN.